May 11, 1926.
E. J. VON HENKE
1,583,906
METHOD OF ELECTRIC WELDING AND APPARATUS THEREFOR
Filed Nov. 10, 1923
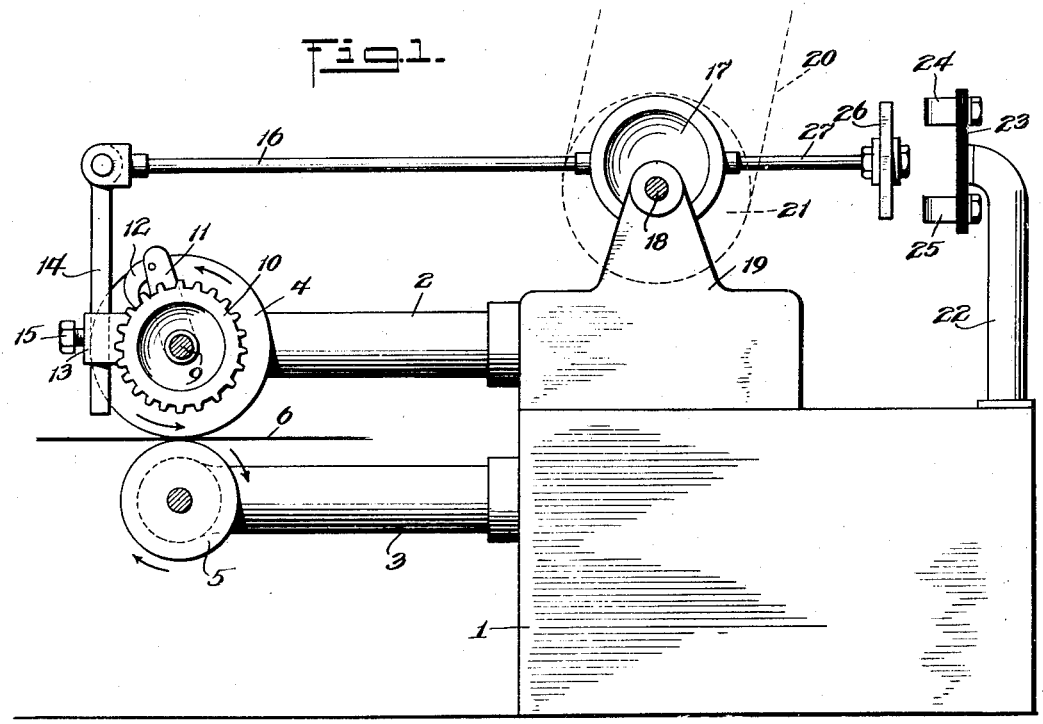
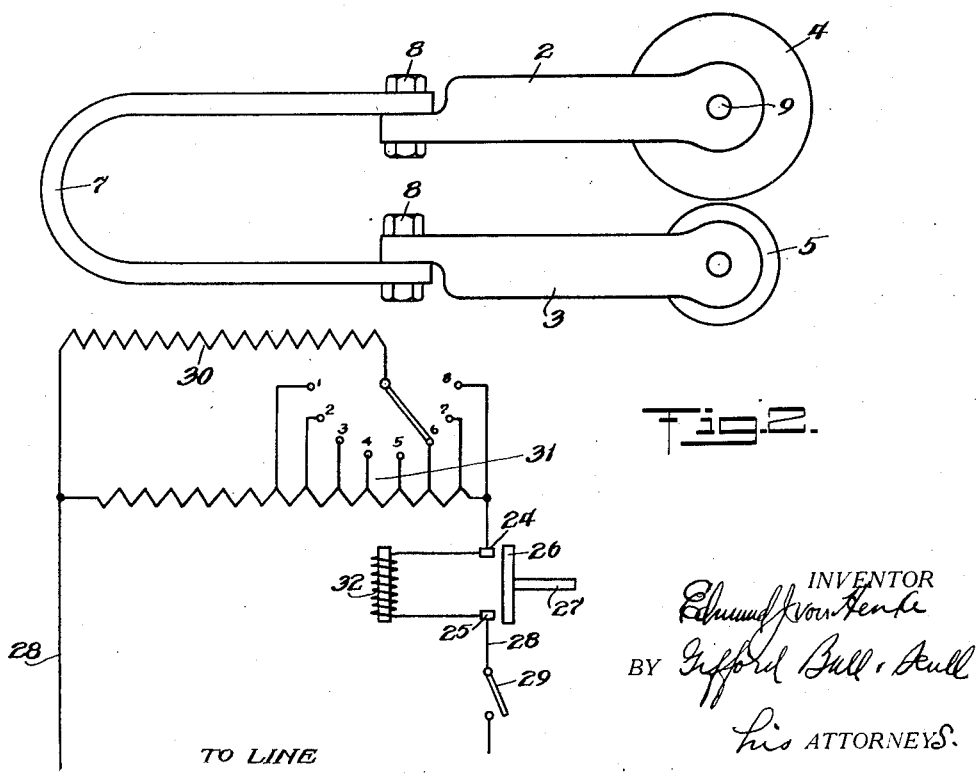

Patented May 11, 1926.

1,583,906

UNITED STATES PATENT OFFICE.

EDMUND J. von HENKE, OF CHICAGO, ILLINOIS.

METHOD OF ELECTRIC WELDING AND APPARATUS THEREFOR.

Application filed November 10, 1923. Serial No. 673,911.

My invention relates to the method of electric welding and apparatus therefor, and particularly to electric seam welding produced by a succession of closely spaced spot welds.

My invention will be better understood by reading the following description taken in connection with the accompanying drawings wherein Fig. 1 is a side elevation of an apparatus for carrying out my method and Fig. 2 shows diagrammatically the electrical circuits of the apparatus shown in Fig. 1.

The drawing is intended merely to illustrate one form of apparatus for carrying out the method and I desire it to be understood that I am in no way limited to the exact parts shown.

Referring to the drawings the casing 1 of the machine has two electrode arms 2 and 3 suitably attached thereto. In the end of the arm 2 is arranged a disc electrode 4 and in the end of the arm 3 is arranged a smaller but similar disc electrode 5. These electrodes are so arranged as to permit the work 6 to pass between them, and the arm 2 is pivotally connected with the casing 1, so that a pressure is created between the electrodes and the work. As shown in Fig. 2 the arms 2 and 3 form a part of the secondary of the welding transformer, the other part being a bundle of copper strips 7 fastened to the arms 2 and 3 by bolts 8.

The shaft 9 which holds the electrode 4 in the arm 2 also carries a ratchet wheel 10, which is fastened to the shaft 9. An arm 11 is loosely mounted on the shaft 9 and carries a pawl 12 which engages the teeth of the ratchet wheel 10. An arm 13 which is connected with the arm 11 is provided with an opening through which a rod 14 extends and which is held in adjustable position by the screw 15. The rod 14 is pivotally connected with a rod 16 which is connected at its other end with an eccentric 17 mounted on a shaft 18 which is carried by lugs 19 extending upward from the casing 1. The shaft 18 is rotated by a belt 20 or other suitable means through a pulley 21.

A support 22 extends upwardly from the casing 1 and carries on its upper end a base 23 of insulating material upon which are mounted the switch contacts 24 and 25. A switch member 26 is carried by a rod 27 which may be operated by the eccentric 17 or a separate eccentric mounted on the shaft 18. The means, per se by which the switch member 26 is operated forms no part of my invention, this means being shown more or less diagrammatically in the drawings. Referring to Fig. 2 it will be noted that the contacts 24 and 25 are in one side 28 of the power line and a main switch 29 is provided for the purpose of disconnecting the welding circuit. A welding transformer of the usual type has its primary 30 connected across the line 28 through the usual regulator 31. An impedance 32 is connected across the switch contacts 24 and 25 for a purpose which will be explained later. The impedance may be either inductive or condensive or a plain resistance element may be used, if desired.

In operation the shaft 18 is rotated and the pawl 12 acting upon the teeth of the ratchet wheel 10 intermittently rotates the electrode 4 in the direction indicated by the arrow in Fig. 1. Each rotation of the electrode 4 causes the work 6 to be moved to the right as viewed in Fig. 1, an amount dependent upon the throw of the eccentric 17 and the adjustment of the rod 14 in the arm 13. At the time that the work is being moved the switch member 26 is separated from the contacts 24 and 25 so that the current flowing through the welding circuit is determined by the amount of the reactance 32. The preferred value of the reactance 32 is that which will produce a reduction in the normal welding current of 40 to 50% so that the current flowing through the work during the time the work is being moved is from 50 to 60% of that which flows during the welding period. The reduction of the current during the movement of the work eliminates the possibility of burning during this time, but the reduced current has the effect of preheating the work so that when the current is again brought to its full value the welding will take place much sooner than if the circuit had been completely interrupted. By this periodic reduction of the welding current during the movement of the work, the speed of the machine may be substantially increased as compared to machines wherein the welding circuit is completely interrupted. Another advantage of the arrangement shown is that by placing the reactance in shunt with the switch contacts the destructive effect of the sparking which takes place upon the opening of the switches contacts when no reactance is provided is substantially eliminated. Consequently the switch and its contacts last for a much longer period by this arrangement than would be the case if no reactance were used.

While I prefer to substantially reduce the current during the movement of the work I wish it to be understood that in certain classes of work the welding current may be left on in its full value continuously. This is particularly true when the work being done is clean. When the machine is operating upon material, some of which is clean and some of which is rusty, the best results are secured by reducing the current during the movement of the work.

Many forms of apparatus may be used to carry out the method heretofore explained and I, therefore, do not limit my invention to the form of apparatus shown and described.

I claim:

1. The method of welding which consists in intermittently moving the work between the welding electrodes while current is passing through the electrodes continuously.

2. The method of welding which consists in intermittently moving the work between roller electrodes while current is passing through the work continuously.

3. The method of welding which consists in intermittently moving the work between roller electrodes and reducing the current without interruption thereof while the work is in motion.

4. In the method of electrical welding in which the work is fed intermittently, the steps of reducing the current without interruption thereof while the work is in motion and bringing it back to welding value while the work is at rest.

5. The method of electrical welding which consists in intermittently moving the work between the electrodes while the welding current is flowing continuously and welding when the work is stationary.

6. In welding apparatus the combination of electrodes, means for causing the work to be moved between said electrodes intermittently, means for supplying welding current without interruption thereof to the work and means for decreasing the current during the movement of the work.

7. In welding apparatus the combination of welding electrodes, means for rotating the electrodes to feed the work intermittently and means for inserting a resistance to current flow while the work is moving.

8. In welding apparatus the combination of welding electrodes, means for rotating the electrodes to feed the work intermittently, a switch in the welding circuit, a shunt circuit around the switch contacts and means for opening the switch while the work is in motion.

9. In welding apparatus the combination of welding electrodes, means for rotating the electrodes to feed the work intermittently, a switch in the welding circuit, a high resistance shunt around the switch contacts and means for opening the switch while the work is in motion.

EDMUND J. von HENKE.